United States Patent
Buffard et al.

(12)

(10) Patent No.: US 6,551,693 B1
(45) Date of Patent: Apr. 22, 2003

(54) HEATING ARTICLE COMPRISING A SURFACE COATED WITH A DECORATIVE ELEMENT CAPABLE OF COLOR CHANGE

(75) Inventors: Jean Pierre Buffard, Aix les Bains (FR); Laurent Voisin, Sales (FR); Claudine Gardaz, Bloye (FR)

(73) Assignee: SEB SA, Ecully (FR)

( * ) Notice: Subject to any disclaimer, the term of this patent is extended or adjusted under 35 U.S.C. 154(b) by 0 days.

(21) Appl. No.: 09/554,369

(22) PCT Filed: Oct. 7, 1999

(86) PCT No.: PCT/FR99/02407

§ 371 (c)(1),
(2), (4) Date: Jul. 7, 2000

(87) PCT Pub. No.: WO00/22395

PCT Pub. Date: Apr. 20, 2000

(30) Foreign Application Priority Data

Oct. 13, 1998 (FR) .............................................. 98 12823

(51) Int. Cl.⁷ ......................... B32B 27/06; B32B 31/26; B32B 33/00; D06F 75/38
(52) U.S. Cl. ....................... 428/195; 428/201; 428/421; 428/542.2; 428/913; 428/422; 427/385.5; 427/388.1; 427/389.7; 427/407.1; 427/407.2; 427/409; 38/93; 99/342; 99/DIG. 10
(58) Field of Search .................... 428/421, 422, 428/542.2, 913.3, 913; 427/385.5, 388.1, 389.7, 407.1, 407.2, 409; 99/342, DIG. 10; 38/88, 93

(56) References Cited

U.S. PATENT DOCUMENTS

| 4,228,761 A | * | 10/1980 | Glover et al. ................ 116/201 |
| 5,135,795 A | | 8/1992 | Gregory et al. ............. 428/195 |
| 5,499,597 A | * | 3/1996 | Kronberg ..................... 116/216 |
| 6,403,361 B1 | * | 8/2000 | Batzar et al. ................ 428/323 |

FOREIGN PATENT DOCUMENTS

| EP | 0188958 A2 | 7/1986 |
| EP | 0603969 A1 | 6/1994 |
| FR | 1 348 591 | 12/1964 |
| FR | 1 388 029 | 12/1965 |
| FR | 2576253 | 7/1988 |

OTHER PUBLICATIONS

Patent Abstracts of Japan, Publication No. 07201462.
Patent Abstracts of Japan, Publication No. 10241470.
Patent Abstracts of Japan, Publication No. 09164082.

* cited by examiner

*Primary Examiner*—Paul Thibodeau
*Assistant Examiner*—Ramsey Zacharia
(74) *Attorney, Agent, or Firm*—Perman & Green, LLP

(57) ABSTRACT

A heating appliance, such as a cooking container, has an inside surface coating including a decoration which changes color as a function of temperature. A decoration based on a thermostable resin and a chemical substance which changes color as a function of temperature is applied over a fluorocarbon resin coating on the inside of the container.

10 Claims, 1 Drawing Sheet

HEATING ARTICLE COMPRISING A SURFACE COATED WITH A DECORATIVE ELEMENT CAPABLE OF COLOR CHANGE

BACKGROUND OF THE DISCLOSURE

1. Field of the Invention

The present invention relates to a heating appliance such as a frying pan, a saucepan, a high-sided frying pan or a iron sole plate having an inside and/or outside surface with a basic coating consisting of a thermostable resin such as a fluorocarbon resin, for example polytetrafluoroethylene.

2. Description of Prior Developments

Cooking containers including means for indicating the temperature of the inside surface of the container are known in the art. Those means generally comprise a temperature sensor integrated into the bottom of the cooking container and connected by conductors to an electronic module including a screen for displaying the temperature measured by the sensor.

The above means constantly inform the user of the temperature of the cooking surface of the container. The user can therefore determine the precise moment at which the cooking surface has reached a temperature sufficient to "sear" meat.

Displaying the temperature of the cooking surface of the container also warns the user that the appliance is hot and could burn someone.

However, the above prior art means have the drawbacks of being complicated and of giving rise to problems of electrical insulation, in particular with regard to washing-up water.

In other embodiments known in the art, the handle includes a temperature indicator near the cooking container proper and consisting of a chemical compound which can change colour at a particular temperature. However, the temperature of the above area does not correspond to the actual temperature of the cooking surface, and so the change of colour of the chemical compound does not really indicate the temperature of the cooking surface.

SUMMARY OF THE INVENTION

The object of the present invention is to propose a particularly simple way to warn the user that the surface of the appliance is hot or has reached a sufficient temperature to use it.

In a heating appliance in accordance with the invention a decoration made up of a thermostable resin resistant to temperatures up to at least 200° C. and of a chemical substance which changes colour as a function of temperature is applied over the thermostable resin which resists temperatures up to at least 200° C. and which coats the surface of the appliance, the decoration covering part of the basic coating and adhering thereto because of the preferably simultaneous but possibly successive curing of the resin constituting the basic coating and the resin constituting the decoration.

The thermostable resin resistant to temperatures up to at least 200° C. is preferably a fluorocarbon resin or a mixture of exclusively fluorocarbon resins or of fluorocarbon resins mixed with other thermostable resins.

The decoration is preferably based on polytetrafluoroethylene (PTFE).

The decoration is preferably applied by screenprinting or by printing by tampoprinting.

The decoration can be applied by the process described in French patent 2 576 253.

The above substance can be iron oxide used alone or mixed with other pigments or colouring agents, such as perylene red bonded to a black pigment.

Because the layer of thermostable resin in which the chemical substance is embedded is transparent the colour change can be seen through it.

If the basic coating is a fluorocarbon resin such as PTFE and the decoration is also based on fluorocarbon resin, curing the basic coating and the decoration enables the particles of the resin of the basic coating to be sintered with the particles of resin of the decoration, and when the curing is simultaneous, simultaneous sintering occurs, then ensuring excellent bonding of the decoration to the basic coating.

The change of colour of the chemical compound indicates to the user that the appliance is hot and therefore may burn someone and that the surface of the appliance has reached the correct temperature for its use.

The basic coating and the decoration are preferably covered with a continuous layer of transparent fluorocarbon resin which is also cured simultaneously with the resin of the basic coating and that constituting the decoration, enabling conjoint sintering of all the particles. The surface obtained then has optimum non-stick properties which are not affected by the presence of the decoration.

Other features and advantages of the invention will become more apparent in the course of the following description.

BRIEF DESCRIPTION OF THE DRAWINGS

In the accompanying drawings, which are given by way of non-limiting example.

DESCRIPTION OF THE PREFERRED EMBODIMENTS

Figure 1:
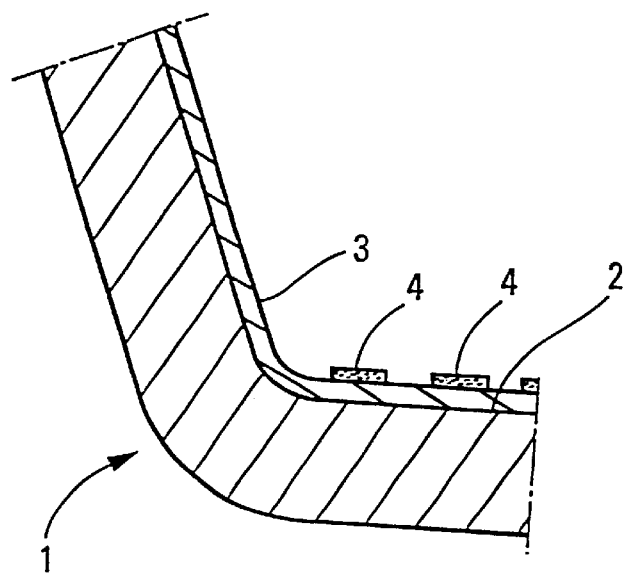
FIG. 1 is a partial view in cross section of a cooking container according to the invention.
Figure 2:
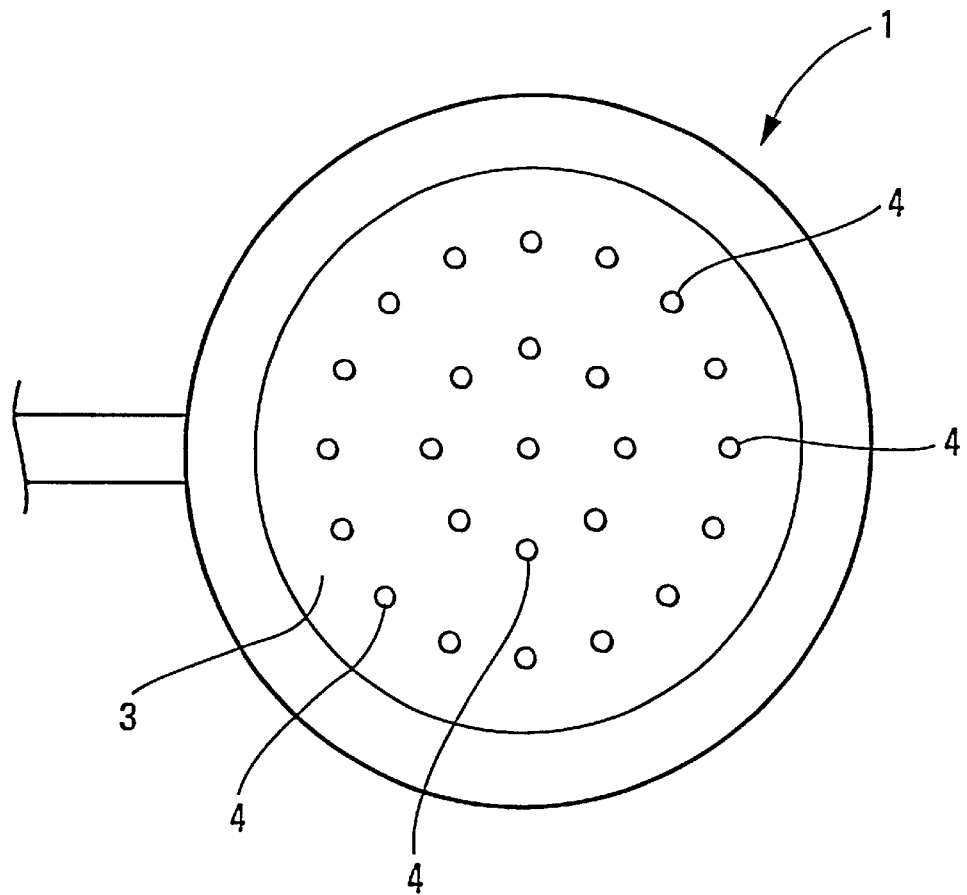
FIG. 2 is a plan view of the cooking container according to the invention showing its inside surface.

In the embodiment of the invention shown in FIGS. 1 and 2 the cooking container is a frying pan 1 and has an inside surface 2 coated with a layer 3 of thermostable fluorocarbon resin.

According to the invention, a decoration 4 based on a thermostable resin resistant to temperatures up to at least 200° C., and on a chemical substance which reversibly changes colour as a function of temperature, is applied over at least part of the thermostable resin layer 3, then the resin constituting the decoration is cured with the resin constituting the basic coating. It can be cured after the resin constituting the basic coating, but it is preferably cured with it in a single simultaneous curing.

The thermostable resin, which is preferably a fluorocarbon resin, can be a mixture of exclusively fluorocarbon resins such as PTFE, PFA, FEP or a mixture of fluorocarbon resins with other thermostable resins resistant to temperatures up to at least 200° C., such as PAI, PES, PPS, PEK, PEEK and silicone.

In the example shown, the decoration 4 consists of one or more figures but the decoration 4 could of course take any other form, for example concentric circles.

The decoration 4 is preferably based on polytetrafluoroethylene.

The decoration 4 can be applied by screenprinting using the process described in French patent 2 576 253 or by printing by tamoprinting or by any other means.

Compared to the process described in the abovementioned French patent, it is sufficient to replace the colouring pigments mixed with the screenprinting paste with a chemical compound adapted to change colour and which can be powder.

In an advantageous embodiment of the invention, the chemical compound is iron oxide.

The iron oxide present in the decoration 4 changes colour when the inside surface 2 of the cooking container 1 reaches the optimum temperature for cooking.

A chemical compound of the above kind is of food grade, unlike the cadmium compounds used in prior art applications.

Thus, the colour change of the iron oxide present in the decoration 4 tells the user that the frying pan is hot and that its inside surface has reached the correct temperature for cooking meat. The colour change is reversible, of course.

The chemical compound can be one which darkens as the temperature rises, such as iron oxide.

The chemical compound can instead be one which lightens as the temperature rises. This is the case with a mixture of organic red (for example perylene red) and black pigment.

The decoration preferably comprises at least two patterns, one containing a chemical compound which darkens as the temperature rises and the other containing a chemical compound which lightens as the temperature rises. In this way the contrast between the two pigments makes it easier to distinguish the change of temperature.

In the example of the chemical compounds cited above, there is a very marked contrast between the two decorations from 200° C., which is the optimum temperature for frying or roasting.

Of course, the invention is not limited to the examples that have just been described to which many modifications can be made without departing from the scope of the invention.

Thus the invention can be applied to any heating appliance and in particular to iron sole plates with a non-stick coating, as well as to any outside surface of cooking utensils, grill plates etc.

What is claimed is:

1. A heating appliance having a surface covered with a basic coating consisting of a thermostable resin resistant to temperatures up to at least 200° C.; a decoration based on a thermostable resin resistant to temperatures up to at least 200° C. and on a chemical substance which reversibly changes color as a function of temperature, the decoration, which comprises at least two patterns containing different respective chemical substances, being applied on the top of the thermostable resin layer constituting the basic coating so as to cover at least part of the basic coating and adhering thereto because of curing of the resin constituting the decoration with the resin constituting the basic coating, wherein a first pattern contains iron oxide as a chemical substance and a second pattern contains as a chemical substance organic red bonded to a black pigment.

2. A heating appliance according to claim 1 wherein said organic red is perylene red.

3. A heating appliance according to claim 1 wherein said thermostable resin resistant to temperatures up to at least 200° C. and on which is based said basic coating and/or said decoration is a fluorocarbon resin, a mixture of exclusively fluorocarbon resins, or a mixture of fluorocarbon resins with other thermostable resins.

4. A heating appliance according to claim 1 wherein said decoration is covered with a continuous layer of substantially transparent PTFE.

5. A heating appliance according to claim 1 in the form of a cooking container.

6. A heating appliance according to claim 1 in the form of an iron sole plate.

7. A method for covering at least one surface of a heating appliance with a basic coating consisting of a thermostable resin resistant to temperatures up to at least 200° C., wherein a decoration based on a thermostable resin resistant to temperatures up to at least 200° C. and on a chemical substance which reversibly changes color as a function of temperature, is applied on at least part of the thermostable resin layer constituting the basic coating, and the resin constituting the decoration is cured with the resin constituting the basic coating, the decoration comprising at least two patterns containing different respective chemical substances, a first pattern containing as a chemical substance iron oxide and a second pattern containing as a chemical substance organic red bonded to a black pigment.

8. A method according to claim 7 wherein said organic red is perylene red.

9. A method according to claim 7 wherein said resin constituting said decoration is cured simultaneously with said resin constituting said basic coating.

10. A method according to claim 7 wherein said decoration is applied by screenprinting or by printing by tampoprinting.

* * * * *